(12) United States Patent
Kurihara (10) Patent No.: US 7,940,420 B2
(45) Date of Patent: May 10, 2011

(54) COLOR IMAGE FORMING APPARATUS AND METHOD AND IMAGE PROCESSING PROGRAM

(75) Inventor: Hideaki Kurihara, Tokyo (JP)

(73) Assignee: Canon Kabushiki Kaisha, Tokyo (JP)

(*) Notice: Subject to any disclaimer, the term of this patent is extended or adjusted under 35 U.S.C. 154(b) by 1157 days.

(21) Appl. No.: 11/271,872

(22) Filed: Nov. 14, 2005

(65) Prior Publication Data
US 2006/0103902 A1 May 18, 2006

(30) Foreign Application Priority Data
Nov. 15, 2004 (JP) .................................. 2004-330954

(51) Int. Cl.
*G06F 15/00* (2006.01)
(52) U.S. Cl. ......... 358/1.9; 358/530; 358/540; 358/463; 358/465; 358/401; 358/3.27; 382/257; 382/167
(58) Field of Classification Search .................. 358/531, 358/530, 443, 400, 500; 348/607, 571
See application file for complete search history.

(56) References Cited

U.S. PATENT DOCUMENTS

| | | | | |
|---|---|---|---|---|
| 5,923,821 A * | 7/1999 | Birnbaum et al. | ............. | 358/1.9 |
| 6,594,030 B1 * | 7/2003 | Ahlstrom et al. | ............ | 358/1.15 |
| 6,654,145 B1 * | 11/2003 | Speck | ............ | 358/1.9 |
| 2001/0033686 A1 * | 10/2001 | Klassen | ........................ | 382/167 |
| 2002/0167526 A1 * | 11/2002 | Kinoshita | ..................... | 345/589 |
| 2003/0179394 A1 * | 9/2003 | Lane et al. | ..................... | 358/1.9 |
| 2004/0080769 A1 * | 4/2004 | Kodama et al. | ............. | 358/1.13 |
| 2004/0081371 A1 * | 4/2004 | Nishide et al. | ................ | 382/298 |
| 2004/0202366 A1 * | 10/2004 | McElvain | ..................... | 382/162 |

FOREIGN PATENT DOCUMENTS

JP  2004262011  9/2004

* cited by examiner

*Primary Examiner* — Benny Q Tieu
*Assistant Examiner* — Martin Mushambo
(74) *Attorney, Agent, or Firm* — Fitzpatrick, Cella, Harper & Scinto (57) ABSTRACT

An image composed of a group of objects contained in a print job is formed on a recording medium with a plurality of color recording materials. Formats of an object are decided by analyzing the object. A size of the object is decided. Trapping processing applied to the object is controlled in accordance with decision results about the formats and the sizes of the object. This makes it possible to provide a color image forming apparatus capable of carrying out appropriate trapping automatically.

3 Claims, 6 Drawing Sheets

COLOR IMAGE FORMING APPARATUS AND METHOD AND IMAGE PROCESSING PROGRAM

BACKGROUND OF THE INVENTION

1. Field of the Invention

The present invention relates to a color image forming apparatus and method and an image processing program, which are applicable to a color print system that prints using color materials consisting of general process colors (cyan, magenta, yellow and black).

2. Description of the Related Art

A color print system using general process colors (cyan, magenta, yellow and black) forms full-color images by forming plates of individual colors using color materials and by combining the plates according to a subtractive mixture theory.

Figure 5:
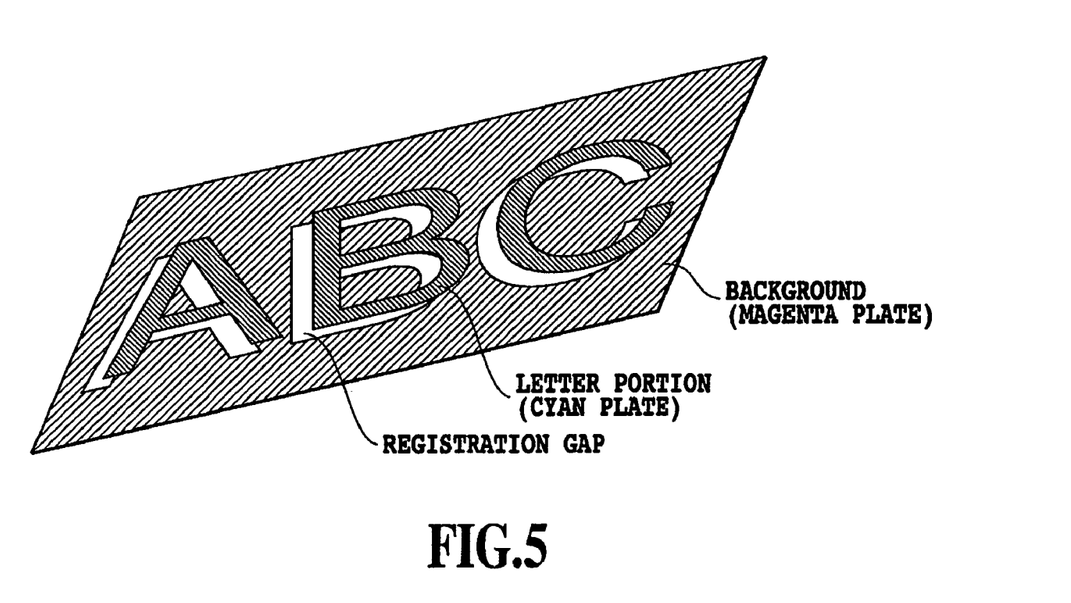
FIG. 5 is a drawing illustrating a registration gap.

When forming a full-color image, unless the individual color plates are registered precisely, a blank space, generally called a registration gap, can occur between the plates, between image portions that ought to be adjacent to each other exactly. FIG. 5 is a conceptual illustration with reference to which the phenomenon will be described. FIG. 5 shows an example in which a letter image of a cyan plate is superimposed on a uniform background image of a magenta plate. The magenta plate has an image, from which the letter portion of the cyan plate is omitted. This is because mixing the magenta with cyan will result in blue. To represent the letters in cyan, therefore, the magenta plate has the portions corresponding to the letters omitted.

When the magenta plate and the cyan plate have their superimposed positions unmatched, the background color is seen around the letters of the cyan plate as shown in FIG. 5, which is called a registration gap.

Figure 6:
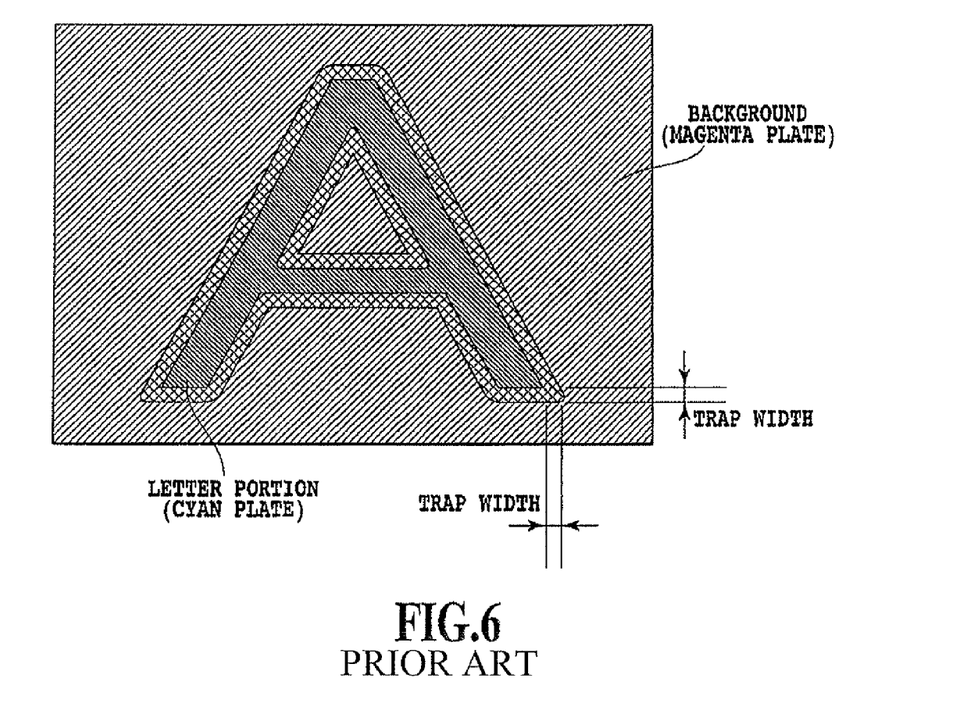
FIG. 6 is a drawing illustrating trapping processing.

Conventionally, to eliminate the registration gap, a technique called trapping processing is applied to image portions in which the plates of individual colors are adjacent to each other. FIG. 6 is a conceptual illustration with reference to which the trapping processing method will be described. The trapping processing method reduces the area of the hollow portions of the magenta plate constituting the background so that the contours of the letter portions of the cyan plate are superimposed on the magenta plate with some width (the "trap width") left in between.

Trapping processing can prevent the occurrence of a registration gap even if the superimposed positions of the magenta plate and cyan plate are displaced from each other as long as the displacement is within the trap width.

A concrete example of trapping processing is as follows. Specifically, an image designer can set an optimum trap width for each object, thereby being able to reflect it on a print image. There is a printer system with a function that applies a preset trap width to all portions in an image. When the printer system automatically carries out the trapping processing, the trapping processing is applied to portions that have no overlap margins (overlap widths/spaces) between plates of different colors. When no overlap margins are present between the plates of different colors, the drawing regions of the lower color plate are revised to provide the margins between the lower and upper color plates.

According to the conventional technique, it is necessary in trapping processing to adjust the trap width manually (see, Japanese Patent Application Lid-Open No. 2004-262011, for example), and otherwise only one value is applied to the entire image uniformly.

Such manual adjustment has a problem of being inefficient because the designer of the image data must carry out the trapping processing manually from image to image using application software capable of trapping processing setting.

When the printer system side uses the automatic trapping processing, the preset trap width is applied to all portions having no overlap margins between the color plates of different colors within the image. As a result, it has an adverse effect in that the trap width can become too large or too small in part. More specifically, when the cyan plate is adjacent to the magenta plate, since the superimposed portions become red because of mixing, too large a margin will result in an image of a cyan object with red edges. In contrast, too small a margin has the problem of being unable to absorb the entire registration gap.

SUMMARY OF THE INVENTION

Therefore, an object of the present invention is to provide a color image forming apparatus and method and an image processing program capable of implementing high-quality trapping processing, taking into consideration the type of an object and other information.

According to a first aspect of the present invention, that is provided a color image forming apparatus for forming, on a recording medium, an image composed of a group of objects contained in a print job with a plurality of color recording materials, said color image forming apparatus comprising: image format decision means for making a decision as to formats of an object by analyzing the object; size decision means for deciding sizes of the object; and control means for controlling trapping processing applied to the object in accordance with the decision results of said image format decision means and said size decision means.

According to a second aspect of the present invention, that is a color image forming apparatus for forming, on a recording medium, an image composed of a group of objects contained in a print job with a plurality of color recording materials, said color image forming apparatus comprising: image format decision means for making a decision as to formats of an object by analyzing the object; interrelationship decision means for deciding, for the object, an interrelationship between the object and another object that is superimposed on the one object; and control means for controlling trapping processing applied to the object in accordance with decision results of said interrelationship decision means.

According to a third aspect of the present invention, that is a color image forming apparatus for forming, on a recording medium, an image composed of a group of objects contained in a print job with a plurality of color recording materials, said color image forming apparatus comprising: image format decision means for making a decision as to formats of an object by analyzing the object; chroma or density information decision means for deciding information on chroma or density of the object; and control means for controlling trapping processing for the object in accordance with decision results of said image format decision means and said chroma or density information decision means.

According to a fourth aspect of the present invention, that is a color image forming method for forming, on a recording medium, an image composed of a group of objects contained in a print job with a plurality of color recording materials, said color image forming method comprising the steps of: making a decision as to formats of an object by analyzing the object; deciding sizes of the object; and controlling trapping processing applied to the object in accordance with decision results about the formats and the sizes of the object.

According to a fifth aspect of the present invention, that is a color image forming method for forming, on a recording medium, an image composed of a group of objects contained in a print job with a plurality of color recording materials, said color image forming method comprising the steps of: making a decision of formats of an object by analyzing the object; deciding, for the object, interrelationship between the object and another object superimposed on the object; and controlling trapping processing applied to the object in accordance with decision results of the interrelationship.

According to a sixth aspect of the present invention, that is a color image forming method for forming, on a recording medium, an image composed of a group of objects contained in a print job with a plurality of color recording materials, said color image forming method comprising the steps of: making a decision as to formats of an object by analyzing the object; deciding information on chroma or density of the object; and controlling trapping processing for the object in accordance with decision results about the formats of the object and the information on the chroma or density of the object.

According to a seventh aspect of the present invention, that is an image processing program applied to a color image forming apparatus for forming, on a recording medium, an image composed of a group of objects contained in a print job with a plurality of color recording materials, said image processing program being executed by a computer, said image processing program comprising the steps of: making a decision as to formats of an object by analyzing the object; deciding sizes of the object; and controlling trapping processing applied to the object in accordance with decision results about the formats and the sizes of the object.

According to a eighth aspect of the present invention, that is an image processing program applied to a color image forming apparatus for forming, on a recording medium, an image composed of a group of objects contained in a print job with a plurality of color recording materials, said image processing program being executed by a computer, said image processing program comprising the steps of: making a decision as to formats of an object by analyzing the object; deciding, for the object, an interrelationship between the object and another object that is superimposed on the one object; and controlling trapping processing applied to the object in accordance with decision results about the interrelationship.

According to a ninth aspect of the present invention, that is an image processing program applied to a color image forming apparatus for forming, on a recording medium, an image composed of a group of objects contained in a print job with a plurality of color recording materials, said image processing program being executed by a computer, said image processing program comprising the steps of: making a decision as to formats of an object by analyzing the object; deciding information on chroma or density of the object; and controlling trapping processing for the object in accordance with decision results about the formats of the object and the information on the chroma or density of the object.

The above and other objects, effects, features and advantages of the present invention will become more apparent from the following description of embodiments thereof taken in conjunction with the accompanying drawings.

DETAILED DESCRIPTION OF THE PREFERRED EMBODIMENTS

The invention will now be described with reference to the accompanying drawings.

Figure 1:
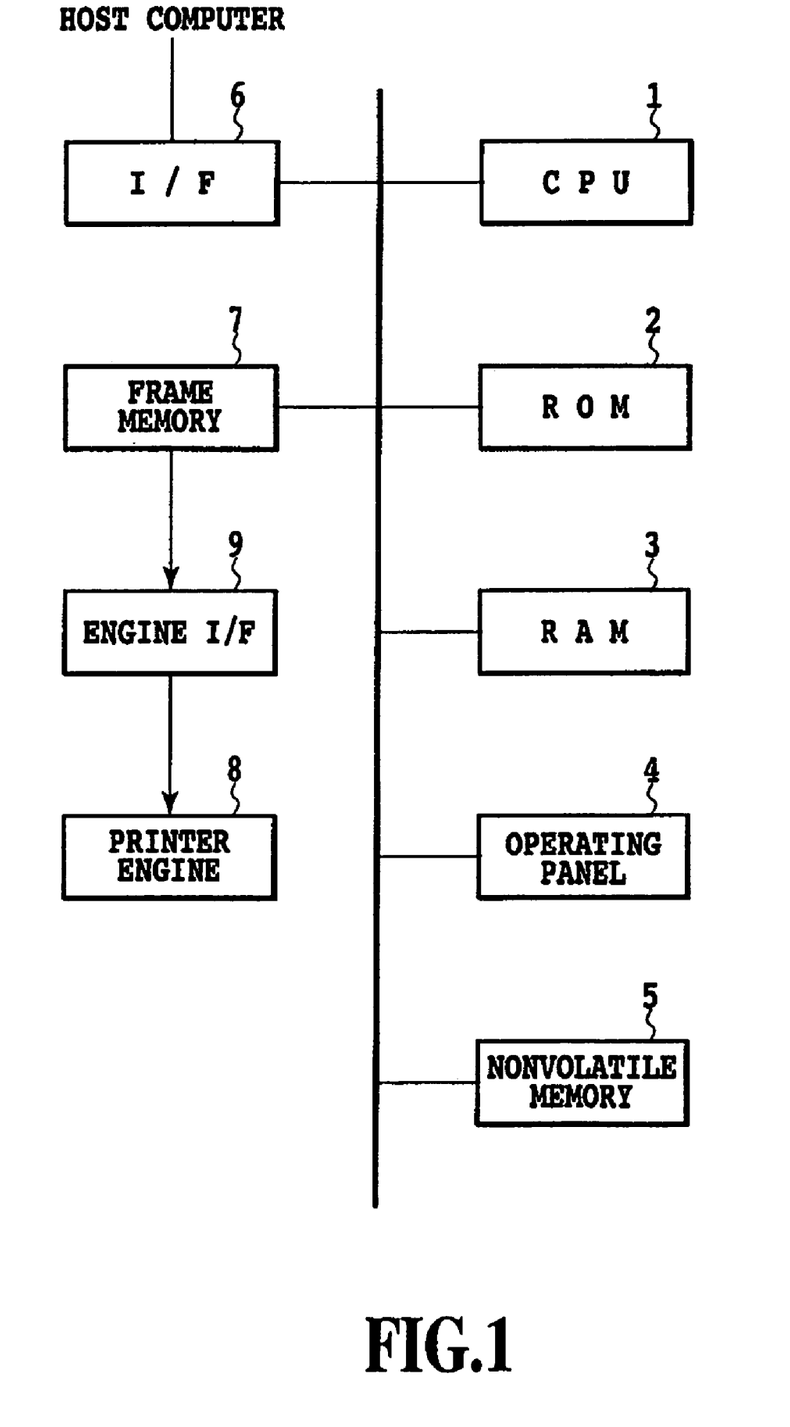
FIG. 1 is a block diagram showing a configuration of a PostScript color printer applied to individual embodiments of the present invention in common.

FIG. 1 is a block diagram showing a configuration of a PostScript color printer applied to individual embodiments in common. In FIG. 1, the reference numeral 1 designates a CPU for controlling the entire apparatus; 2 designates a ROM for storing processing procedures of the CPU 1 (including the processing procedures of FIGS. 2, 3 and 4) and font data; and 3 designates a RAM used as a work area of the CPU 1. The reference numeral 4 designates an operating panel on which a liquid crystal display and a variety of keys are disposed. The reference numeral 5 designates a nonvolatile memory (such as a RAM always supplied with battery power, or EEPROM or flash memory) for storing set information. The reference numeral 6 designates an interface for receiving as print data a print job composed of a page description language from an external unit such as a host computer. The PostScript color printer can be operated as a network printer. In this case, the interface 6 is connected to the network to receive the print data from the host computer. The reference numeral 7 designates a frame memory on which bit map images (of four colors Y, M, C and K) to be printed can be developed. The reference numeral 8 designates a printer engine for actually carrying out the print processing. The reference numeral 9 designates an engine interface for outputting the bit map image data of the individual color components, which are developed on the frame memory 7, to the printer engine 8. Although the following description is made under the assumption that the printer engine 8 is a laser beam printer engine, this is not essential. For example, the printer engine 8 may be a printer of the type that discharges ink droplets. In this case, the frame memory 7 may have a memory capacity required for a single or several times of scanning of a recording head. The print job received through the interface 6 is temporarily stored in the RAM 3. The print job information stored temporarily in the RAM 3 is converted to a raster image (bit map image) through the processing of deciding the format of the objects and the processing including the trapping processing, which will be described later, and is stored in the frame memory 7.

Embodiment 1

Figure 2:
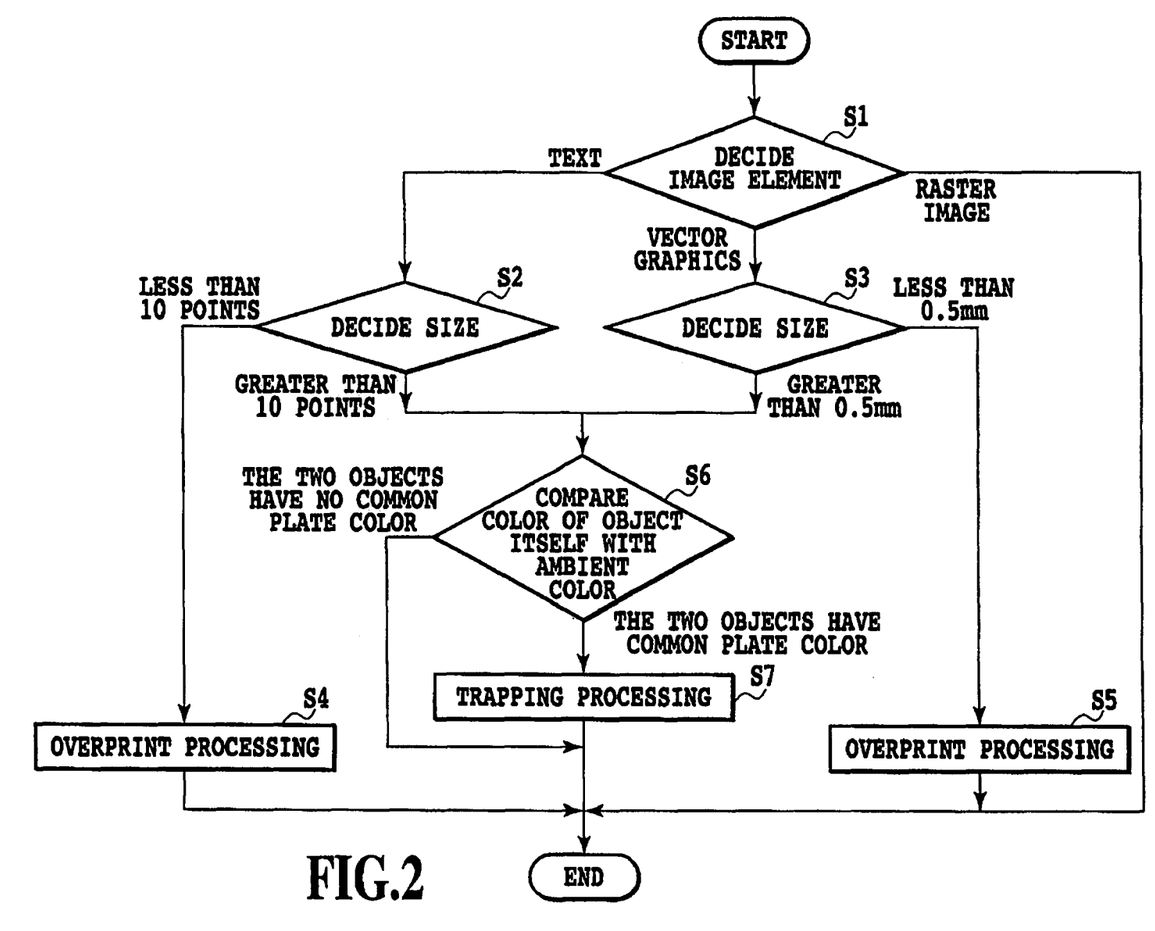
FIG. 2 is a flowchart illustrating processing of a PostScript-compatible color printer in accordance with a first embodiment.

FIG. 2 shows a processing flow of a PostScript-compatible color printer of a first embodiment.

In the PostScript language, one of the page description languages, objects are roughly classified into three types: text; vector graphics; and raster image object. In the present embodiment, a decision is made as to which type of objects the object contained in the image information belongs to, text, vector graphics or raster image (step S1). When a decision is made that the object is text, the processing proceeds to step S2, and when a decision is made that the object is vector graphics, the processing proceeds to step S3. At steps S2 and S3, a decision is made as to whether the object has a small size or not (the latter possibility being sometimes referred to herein as "other size").

At S2, a decision is made as to the point number representing the size of the text object passing through the foregoing decision. When the point number of the text object is less than 10 points (that is, small size), the processing proceeds to step S4, and when it is greater than 10 points, the processing proceeds to step S6. At step S3, a decision is made as to the size of the minimum width of the vector graphics object passing through the decision. When the size of the minimum width of the vector graphics is less than 0.5 mm (that is, small size), the processing proceeds to step S5, and when it is greater than 0.5 mm, the processing proceeds to step S6. As for concrete values of the small size, thin lines whose minimum thickness is equal to or less than 0.5 mm are appropriate for vector graphics objects, and letter objects less than 10 points are appropriate for text objects. When a decision is made that the size of the text or vector graphics object is small at step S2 or S3, trapping processing is not carried out, and the processing proceeds to step S4 or S5, and the image undergoes the same processing as overprinting, substantially.

At step S6, the color of the object of interest itself is compared with its ambient color, that is, the color adjacent to the object. As a result, when the two have no common plate color component, trapping processing is applied at step S7 because there is a high possibility that a registration gap will occur. At step S7, in the case of a vector graphics object, a preset value is used as the trap width, which is usually set at about 50 µm. As for text objects, since there is a strong tendency that registration gaps around letters are particularly objectionable, the trap width is set at about 100 µm. Thus, for both vector graphics objects and text objects, the optimum trapping processing corresponding to the object sizes is executed.

At step S6, if a common plate color component is present, that is a color exists in common as between the color of the object of interest itself and the ambient color adjacent to the object, the processing is completed, without proceeding to step S7.

When the object passing through the decision at step S1 is a raster image, trapping processing is not carried out. This is because raster images are usually composed of data obtained by scanning a silver salt photograph or data picked up by a digital camera. In other words, it is rare that these data have no overlap margin between the individual color plates, and adverse effects of trapping processing such as color changes at superimposed portions become conspicuous.

In the overprint processing at steps S4 and S5, the corresponding image portions of the individual plates are processed in such a manner that they are exactly superimposed on each other (printing of only an image portion of a certain plate is not carried out, but printing is carried out in a manner that colors of the individual plates are mixed). This processing prevents a discrepancy occurring due to the interference of the trap width itself through the overprint processing.

Embodiment 2

Figure 3:
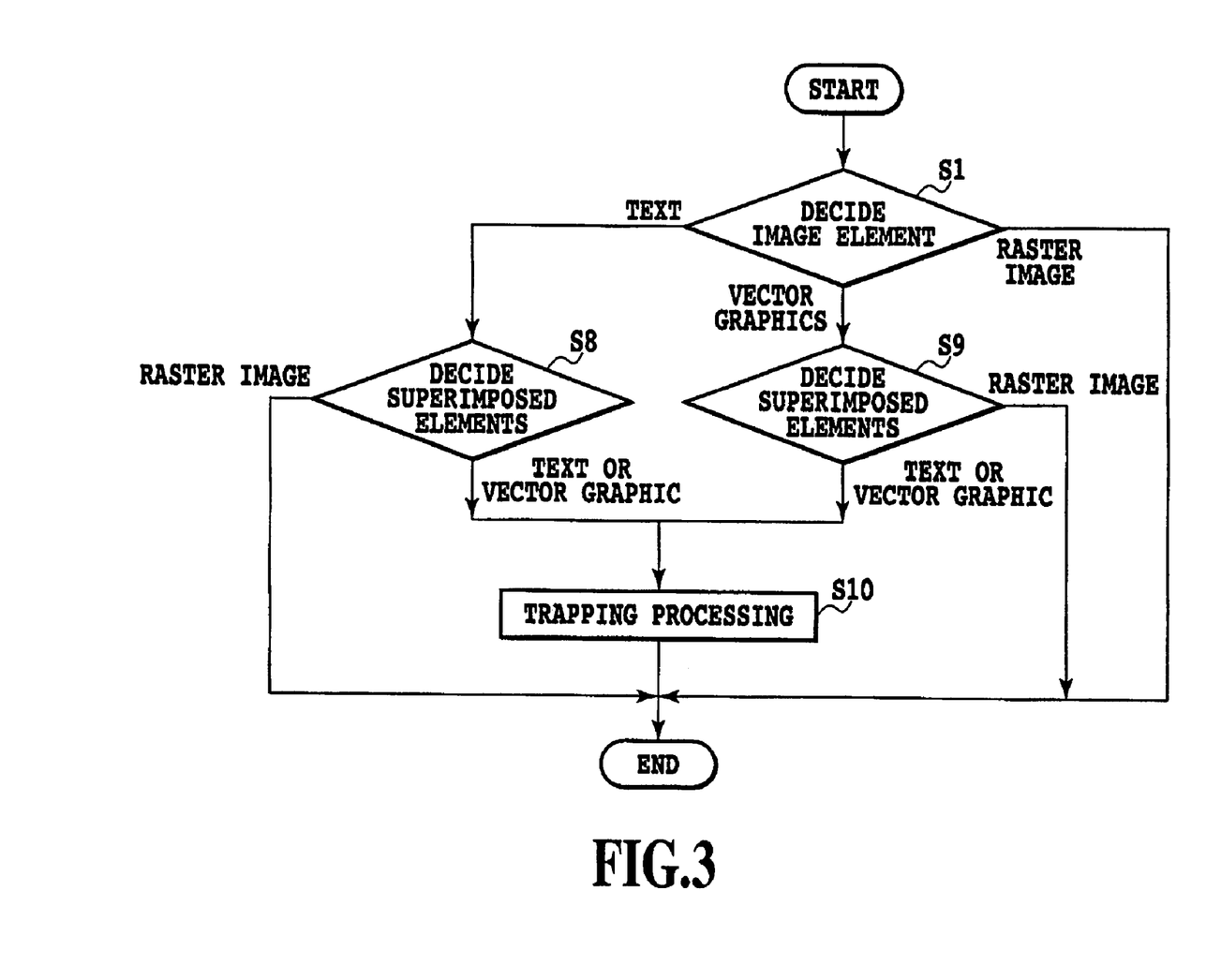
FIG. 3 is a flowchart illustrating processing of a PostScript-compatible color printer in accordance with a second embodiment.

FIG. 3 shows a processing flow of the PostScript color printer of a second embodiment in accordance with the present invention.

In the present embodiment, a decision is made as to which type of objects the object contained in the image information belongs to, text, vector graphics or raster image. Subsequently, referring to the relationships between the types of the individual objects passing through the decision and other objects superimposed on those objects, the optimum trapping processing is carried out. More specifically, the processing varies depending on whether (1) a raster image object is superimposed on a text object or vector graphics object passing through the decision, or (2) a vector graphics object is superimposed on a text object passing through the decision.

In the present embodiment, a decision is made at step S1 as to which type of objects the object belongs to, text, vector graphics or raster image. When a decision is made that the object is a text object, the processing proceeds to step S8, and when a decision is made that the object is vector graphics, the processing proceeds to step S9.

At step S8, when the object superimposed on a text object passing through the decision at S1 is also a text object or is a vector graphics object, normal trapping processing is carried out at step S10. At step S8, when the object superimposed on the text object is a raster image object, the processing is completed without carrying out trapping processing.

At step S9, when the object superimposed on the vector graphics object passing through the decision at step S1 is a text object or another vector graphics object, normal trapping processing is carried out at step S10. At step S9, when the object superimposed on the vector graphics object is a raster image object, the processing is completed without carrying out trapping processing.

When the object passing through the decision at step S1 is a raster image, the processing is completed without making a decision as to the superimposed object, and without carrying out trapping processing.

The present embodiment offers an advantage of being able to carry out trapping processing when a text object, which requires trapping processing most, is superimposed on a vector graphics object.

Embodiment 3

Figure 4:
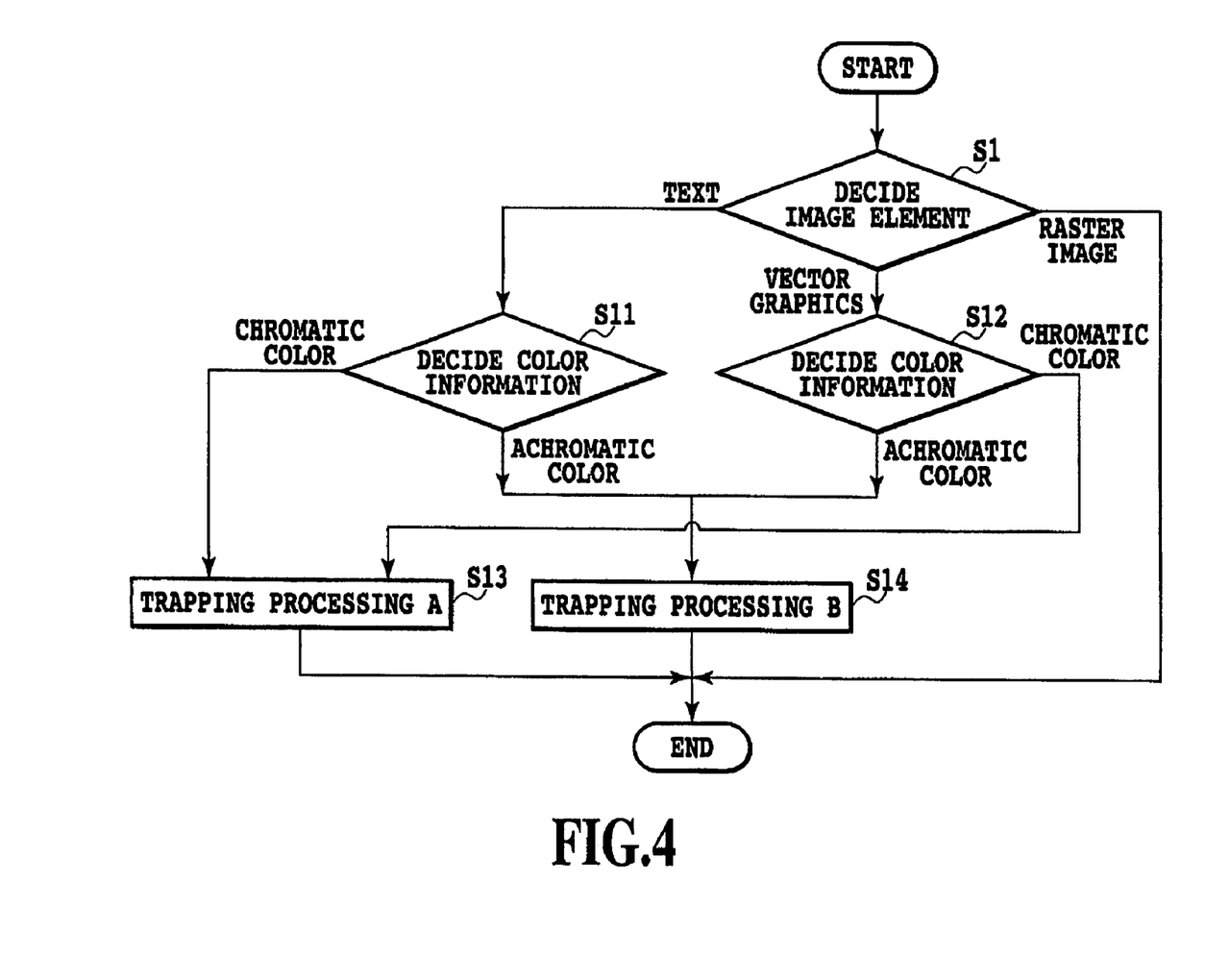
FIG. 4 is a flowchart illustrating processing of a PostScript-compatible color printer in accordance with a third embodiment.

FIG. 4 shows a processing flow of the PostScript color printer of a third embodiment in accordance with the present invention.

In the present embodiment, a decision is made at step S1 as to which type of objects the object contained in the image information belongs to, text, vector graphics or raster image. When a decision is made at step S1 that the object is a text object, the processing proceeds to step S11; and when a decision is made that the object is a vector graphics object, the processing proceeds to step S12. At step S11, a decision is made as to whether the color information of the text object is chromatic or achromatic color. When a decision is made at step S11 that the color information of the text object is chromatic color, the processing proceeds to step S13, and when a decision is made that the color information is achromatic color, the processing proceeds to step S14. At step S12, a decision is made as to whether the color information of the vector graphics object is chromatic or achromatic color. When a decision is made at step S12 that the color information of the vector graphics object is chromatic color, the processing proceeds to step S13, and when a decision is made that the color information is achromatic color, the processing proceeds to step S14.

At step S13, the text or vector graphics object passing through the decision of the chromatic color is subjected to trapping processing A. Generally, the trapping processing applied to the object with chromatic color causes the portions (trapping-width portions) of the object with a chromatic color superimposed on the background (the background being the object on which the object with a chromatic color is superimposed), obtained by the trapping to undergo color mixing, resulting in colors different from the original colors. This will give the object an edge if the trap width is large, thus undesirably changing the impression of the finished print image. Accordingly, in trapping processing A, the trap width is set at as small a value as possible, such as about 50 μm.

At step S14, the text or vector graphics object passing through the decision of an achromatic color is subjected to trapping processing B. The process colors (CMY) have a tendency to approach gray or achromatic color when mixed. Consequently, applying the trapping processing to the text or vector graphics object passing through the decision that the color information of that object is achromatic color will rarely cause conspicuous edges of a different color around the object. (The color of trapping regions created in the periphery of the object with an achromatic color is close to gray obtained by mixing the process colors.) Accordingly, in trapping processing B, the trap width is set at a rather large value, such as 100 μm, to prevent occurrence of a registration gap as much as possible.

The present embodiment offers the advantage of being able to carry out the optimum trapping processing by making a decision as to whether the object has chromatic or achromatic color.

In the foregoing embodiment, at steps S11 and S12, a decision is made as to whether the object to be processed has chromatic or achromatic color. However, a decision may be made as to whether or not the density of the object to be processed is higher than a predetermined density. In this case, when the density of the object to be processed is higher than the predetermined value, the processing proceeds to step S14, and when the density of the object to be processed is not higher than the predetermined value, the processing proceeds to step S13.

Other Embodiments

It is possible to provide a system or apparatus with a recording medium storing software program code that can implement the functions of the foregoing embodiments. The foregoing embodiments can be achieved by a computer (or CPU or MPU) of the system or apparatus, which reads out the program code stored in such recording medium, and executes the program code. In this case, the program code itself read out of the recording medium implements the functions of the foregoing embodiments, and the program code can be written in a variety of recording media such as a CD, MD, memory card and MO.

In addition, according to the instructions of the program code the computer reads out, the operating system (OS) and the like working on the computer can execute part or all of the actual processing. This can also implement the functions of the foregoing embodiments.

Furthermore, it is also possible to write the program code read out of the recording medium to a memory in a function expansion card inserted into the computer or in a function expansion unit connected to the computer. According to the instructions of the written program code, the CPU and the like in the function expansion card or function expansion unit executes part or all of the actual processing, thereby being able to implement the functions of the foregoing embodiments.

The foregoing embodiments are described by way of example in which the present invention is applied to a PostScript color printer that processes a print job composed of a PostScript language, as an example of a print job composed of a page description language. As print jobs composed of other page description languages, there are jobs composed of PCL, LIPS, ESC/P, etc., and the present invention is also applicable to printers that process print jobs composed of these page description languages.

The present invention has been described in detail with respect to preferred embodiments, and it will now be apparent from the foregoing to those skilled in the art that changes and modifications may be made without departing from the invention in its broader aspect, and it is the intention, therefore, in the appended claims to cover all such changes and modifications as fall within the true spirit of the invention.

This application claims priority from Japanese Patent Application No. 2004-330954, filed Nov. 15, 2004, which is hereby incorporated by reference herein.

What is claimed is:

1. A color image forming apparatus for forming, on a recording medium, an image composed of a group of objects contained in a print job with a plurality of color recording materials, the color image forming apparatus comprising:
   image format decision means for making a determination whether a first object corresponds to text, vector graphics or a raster image;
   superimposed object format decision means for determining whether a second object, which is superimposed on the first object determined to correspond to text or graphics by the image format decision means, corresponds to text, vector graphics or a raster image; and
   trapping processing means for carrying out trapping processing to the first object determined to correspond to text or graphics, when the second object is determined to correspond to text or vector graphics,
   wherein when it is determined by the image format decision means that the first object corresponds to the raster image, the trapping processing is not applied to the raster image, without a determination of a type of object superimposed on the raster image,
   and when the superimposed object format decision means determines that the second object corresponds to the raster image, the trapping processing is not applied to the first object determined to correspond to text or graphics.

2. A color image forming method for forming, on a recording medium, an image composed of a group of objects contained in a print job with a plurality of color recording materials, the color image forming method comprising:
   using a processor to perform the steps of:
   determining whether a first object corresponds to text, vector graphics or a raster image;
   determining whether a second object, which is superimposed on the first object determined to correspond to text or graphics, corresponds to text, vector graphics or a raster image; and
   carrying out trapping processing to the first object determined to correspond to text or graphics, when the second object is determined to correspond to text or vector graphics,
   wherein when it is determined that the first object corresponds to the raster image, the trapping processing is not applied to the raster image, without a determination of a type of object superimposed on the raster image,
   and when it is determined that the second object corresponds to the raster image, the trapping processing is not applied to the first object determined to correspond to text or graphics.

3. An image processing program applied to a color image forming apparatus for forming, on a recording medium, an image composed of a group of objects contained in a print job with a plurality of color recording materials, the image processing program being executed by a computer, the image processing program being stored, in executable form, in a non-transitory computer-readable storage medium, and comprising the steps of:

determining whether a first object corresponds to text, vector graphics or a raster image;

determining whether a second object, which is superimposed on the first object determined to correspond to text or graphics, corresponds to text, vector graphics or a raster image; and carrying out trapping processing to the first object determined to correspond to text or graphics, when the second object is determined to correspond to text or vector graphics, wherein when it is determined that the first object corresponds to the raster image, the trapping processing is not applied to the raster image, without a determination of a type of object superimposed on the raster image, and when it is determined that the second object corresponds to the raster image, the trapping processing is not applied to the first object determined to correspond to text or graphics.

* * * * *